Oct. 16, 1923.
A. W. FORBES
BALL OR ROLLER BEARING
Filed Dec. 12, 1922
1,471,254
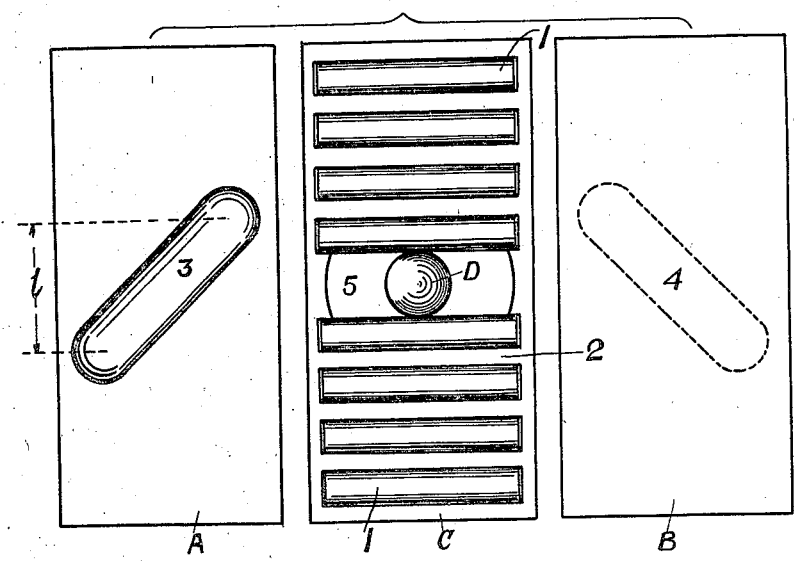
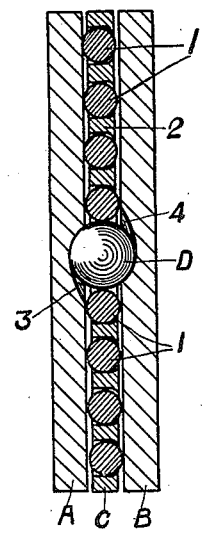
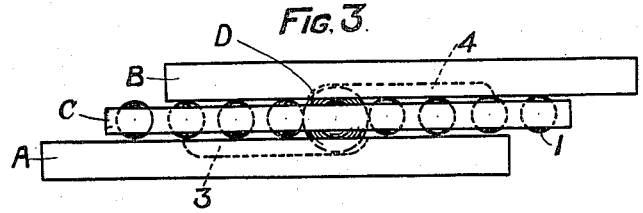
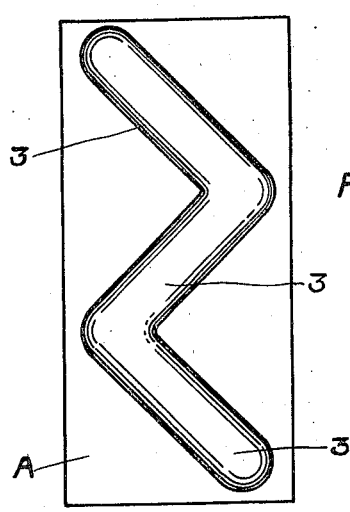

Patented Oct. 16, 1923.

1,471,254

UNITED STATES PATENT OFFICE.

ARCHIBALD WALLACE FORBES, OF SANTO DOMINGO, SANTO DOMINGO REPUBLIC, WEST INDIES.

BALL OR ROLLER BEARING.

Application filed December 12, 1922. Serial No. 606,430.

*To all whom it may concern:*

Be it known that I, ARCHIBALD WALLACE FORBES, British subject, and a resident of Santo Domingo R. D., Santo Domingo Republic, West Indies, have invented certain new and useful Improvements in Ball or Roller Bearings, of which the following is a specification.

This invention relates to a differential or corelating device for bearings of the type having three superimposed elements capable of relative sliding or rotary motion and in which the interposed or intermediate element may have friction-reducing balls or rollers or their equivalent.

Hitherto the use of ball or roller bearings having an interposed anti-friction element, has been rendered difficult in many positions. For instance, when applied to reciprocating bearing surfaces, either inclined or vertical, and subject to intermittent load and vibration, the balls, roller spacing-device or anti-friction spacing element, are liable to be displaced from their required position.

The present invention provides a means of corelating the movement of the elements of a ball or roller bearing or other bearing of the type described, whereby the travel of the intermediate element or ball or roller spacing element will be in correct ratio relative to the bearing surfaces; or whereby any regulated relative movement can be given to the three elements of the bearing.

The device may be interposed between a sliding valve and its valve face or between a piston and the cylinder walls of a pump or engine cylinder. The intermediate element may in this latter case act as a slide sleeve valve.

According to the present invention the means for corelating the position of the elements comprises a corelating member carried by the intermediate element and adapted to travel in oppositely-directed diagonal slots, guides or grooves in the opposing bearing-surfaces, said slots being preferably inclined at equal angles to the direction of travel. The corelating member may consist of a ball, roller or slide block carried in a slot in the intermediate element.

In order that the invention may be more clearly understood reference is hereinafter made to the accompanying explanatory drawings illustrating the application of my invention, by way of example, to a roller bearing.

On the drawings:—

Fig. 1 is a plan view of the three elements of the roller bearing placed side by side.

Fig. 2 is a longitudinal sectional view through the assembled bearing.

Fig. 3 is a side view showing the travel of the bearing.

Fig. 4 illustrates a modified form of bearing surface.

The roller bearing illustrated comprises (Fig. 1) three elements A, B and C, the elements A and B forming the bearing surfaces or roller paths whilst the element C consists of the rollers 1 and cage or roller-spacing device, 2. The means for corelating the position of the elements A and B comprises a ball D protruding from the cage 2 and carried therein. The ball D engages a diagonal groove 3 in the element A and an oppositely-directed diagonal groove 4 in the element B, said grooves being shown as each inclined at 45 degrees to the direction of travel.

In consequence of the equal inclination of the grooves 3 and 4, the maximum relative movement between the elements A and B is equal to twice the distance $l$ (Fig. 1) and in the mid-position (Fig. 2) the ball D will be centrally disposed. By reason of the rolling of the ball D in opposite directions in the grooves of the elements A and B, the ball D will only travel a total distance longitudinally equal to the length $l$ and in any intermediate position the ball D will have travelled a longitudinal distance equal to half the relative movement of the elements A and B.

The element C may be positively related to only one of the elements A or B by causing the ball D to engage a guide groove in only one of the elements A or B.

The ball D may be mounted in a slot in the element C, or, as shown on the drawing, the ball may travel in a slot or space 5 formed between two of the rollers 1.

In the construction illustrated, the grooves 3 and 4 are of limited length and this limits the travel of the ball D and consequent relative movement between the elements A and B. The relative movement may also be limited by the length of the slot 5.

Where the elements A and B are required to have a greater relative movement than the travel allowed by the grooves 3 and 4 in Fig. 1, the grooves may be extended in zig-zag formation as indicated in Fig. 4 to give any desired length of travel within the limits of length of the elements A and B.

The roller bearing illustrated is applicable, by way of example, to the valve face of gate valves or the like.

Instead of the ball D illustrated on the drawings, I may employ a roller or slide block the ends of which protrude from the element C, whilst the middle portion moves between two of the rollers 1.

It is not essential that the ball D be carried between the rollers 1. The ball D may be mounted in an extension of the roller cage 2 and adapted to work in grooves or guides in members forming extensions of the bearing elements A and B. This arrangement may be adopted where it is desirable that the corelating means should be disposed at a distance from the bearing or at right angles thereto as in the case of square-threaded screw and nut mechanism having interposed spiral ball bearings, in which case the corelating slots would be on the core of the screw and on the crown of the thread of the nut respectively.

It will be understood that by varying the angle of one groove relative to the other, the relative movements of the three superimposed elements or surfaces will vary and that almost any predetermined relative movement may be obtained by suitable selection of the angles of the two opposing grooves.

If increased bearing is required, a plurality of corelating balls or like members may be employed, each engaging a pair of opposing grooves, adjacent pairs of grooves being preferably opposed in direction in order to maintain equilibrium.

Claims:

1. Means for corelating the elements of a bearing of the type having three elements capable of relative sliding motion, comprising a corelating member carried by the intermediate element and adapted to engage in oppositely directed diagonal guide grooves in the outer elements.

2. Means for corelating the elements of a bearing of the type having three elements capable of relative sliding motion, comprising a corelating member reciprocable in a slot in the intermediate element and adapted to travel in a guide groove in an outer element.

3. Means for corelating the elements of a bearing of the type having three elements capable of relative sliding motion, comprising a corelating member reciprocable in a slot in the intermediate element and adapted to travel in oppositely directed diagonal guide grooves in the outer elements.

4. Means for corelating the elements of a bearing of the type having three elements capable of relative sliding motion, comprising a corelating member carried by the intermediate element and adapted to engage in a guide groove in an outer element, the length of said guide groove determining the limit of relative travel of the outer elements.

5. Means for corelating the elements of a bearing of the type having three elements capable of relative sliding motion, comprising a corelating member carried by the intermediate element and adapted to engage in oppositely directed diagonal guide grooves in the outer elements, the length of said guide groove determining the limit of relative travel of the outer elements.

6. Means for corelating the elements of a bearing of the type having three elements capable of relative sliding motion, comprising a corelating member carried by the intermediate element and adapted to travel in oppositely directed diagonal guide grooves forming zig-zag tracks in the outer elements, substantially as described.

7. Means for corelating the elements of a bearing of the type having three elements capable of relative sliding motion, comprising a ball reciprocable in a slot in the intermediate member and adapted to travel in oppositely directed diagonal guide grooves in the outer elements.

The foregoing specification signed at Santo Domingo, Dominican Republic, this 8th day of November, 1922.

ARCHIBALD WALLACE FORBES.